United States Patent [19]

Takasuka et al.

[11] Patent Number: 4,742,504
[45] Date of Patent: May 3, 1988

[54] AUTOMATIC DISK CASSETTE CHANGER

[75] Inventors: Shingo Takasuka; Yoshiaki Tago, both of Yokohama, Japan

[73] Assignee: Kabushiki Kaisha Toshiba, Kawasaki, Japan

[21] Appl. No.: 735,066

[22] Filed: May 17, 1985

[30] Foreign Application Priority Data

May 17, 1984 [JP] Japan .................................. 59-99260

[51] Int. Cl.$^4$ ......................... G11B 5/48; G11B 17/00
[52] U.S. Cl. ........................................ 369/36; 369/77.2
[58] Field of Search ...................... 369/34, 36, 37, 38, 369/39, 77.1, 77.2

[56] References Cited

U.S. PATENT DOCUMENTS

| | | | |
|---|---|---|---|
| 3,246,899 | 4/1966 | Bodenroder | 369/39 |
| 4,170,030 | 10/1979 | Castrodale et al. | 360/98 |
| 4,502,133 | 2/1985 | Sityj et al. | 369/36 |
| 4,504,936 | 3/1985 | Faber et al. | 369/34 |
| 4,507,768 | 3/1985 | Ikedo et al. | 369/77.1 |
| 4,608,679 | 8/1986 | Rudy et al. | 369/36 |

Primary Examiner—Steven L. Stephan
Attorney, Agent, or Firm—Finnegan, Henderson, Farabow, Garrett & Dunner

[57] ABSTRACT

An automatic disk cassette changing apparatus employs a pair of cassette storage racks for holding a plurality of optical disk cassettes in an upright (vertical) position. A motor operated loading mechanism checks to see if an operator has properly loaded a cassette onto a transport slide and then moves the slide to place the cassette in a predetermined position inside the apparatus. A cassette handling mechanism including a tiltable carrying frame then picks up the cassette and delivers it either to a storage slot in one of the storage racks or to an optical read/write unit. To insert a cassette into the latter, the carrying frame is tilted 90 degrees so that the cassette is loaded into the read/write unit in approximately a horizontal position. The handling mechanism employs three separate motors for raising and lowering the carrying frame, for tilting the carrying frame, and for moving the frame from side-to-side in response to control commands.

11 Claims, 12 Drawing Sheets

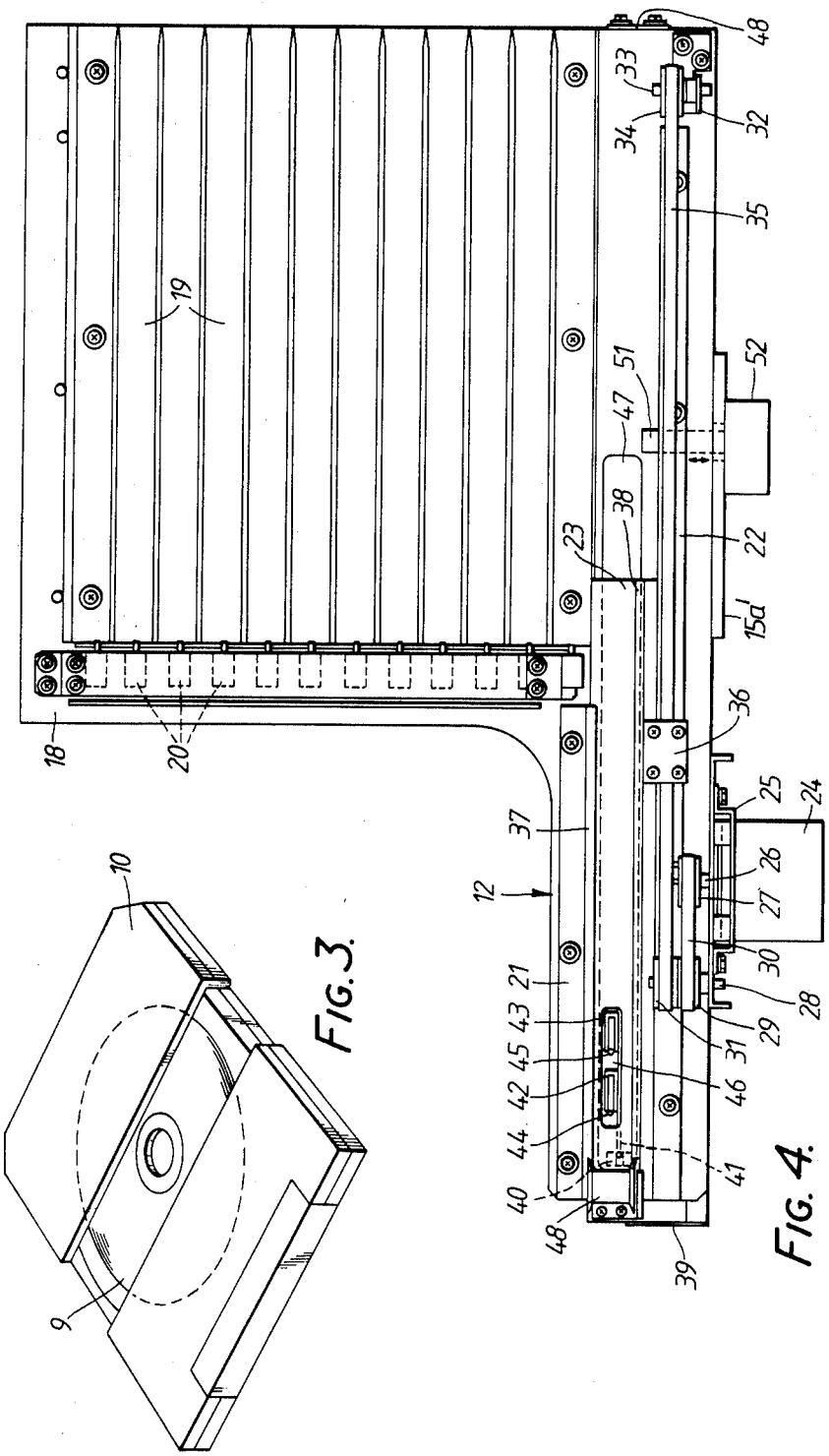

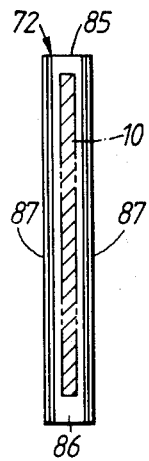
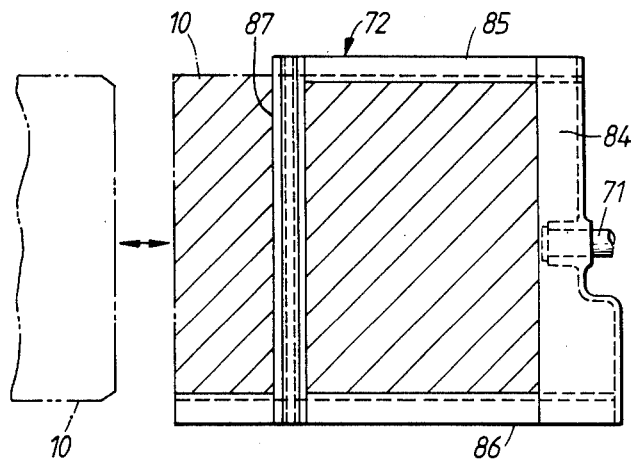
FIG.13.                FIG.14.
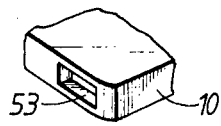
FIG.15.
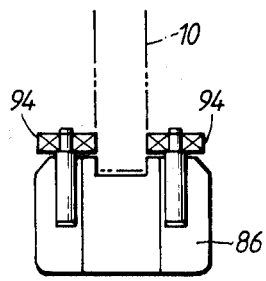
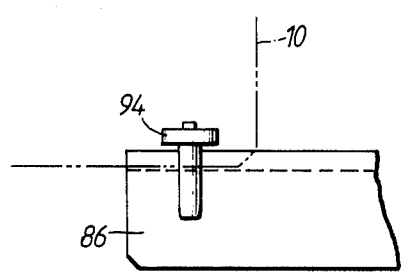
FIG.16.                FIG.17.

AUTOMATIC DISK CASSETTE CHANGER

BACKGROUND OF THE INVENTION

The present invention relates to an automatic disk cassette changer which automatically inserts/removes a disk cassette into/from an optical disk unit and automatically substitutes specified disk cassettes for each other.

The conventional disk changer is such that a disk cassette containing a disk as information storage media is manually inserted into the inner store from the inlet. This produces a problem that a disk cassette must be manually inserted deep along the guide.

The conventional disk changer permits a round and light-weight disk to be carried in comparatively good accuracy by holding part of the disk with a chuck of simple configuration; but, carrying a square and heavy-weight disk contained in a cassette requires a heavy-weight chuck of complicated configuration in order to assure good accuracy.

SUMMARY OF THE INVENTION

It is an object of the invention to provide an automatic disk cassette changer which permits disk cassettes to be automatically loaded and removed from a disk unit.

Another object of the invention is to provide an automatic disk cassette changer which permits disk cassettes to be accu rately positioned for information recording/reading operations.

The invention relates to an automatic disk cassette changer which automatically inserts/removes a disk cassette into/from an optical disk unit and automatically substitutes specified disks for each other and is characterized by a feature that a disk cassette containing disks can be carried automatically from/to the outside to/from the store, achieving the above purposes.

In addition, the invention relating to such an automatic disk replacement unit is characterized by another feature that a disk cassette containing disks, which is caught completely in the carring frame, is carried out.

BRIEF DESCRIPTION OF DRAWINGS

FIG. 3 is a perspective view of a disk cassette;

FIG. 4 is a plan view of the cassette loading device;

FIG. 13 is a front view of the carrying frame containing a disk cassette;

FIG. 14 is a side view of the carrying frame containing a disk cassette;

FIG. 15 is a perspective view of a recess provided in a disk cassette;

FIG. 16 is a front view of a guide roller provided in the carrying frame;

FIG. 17 is a side view of the guide roller of FIG. 16;

DETAILED DESCRIPTION OF THE PREFERRED EMBODIMENT

Figure 2:
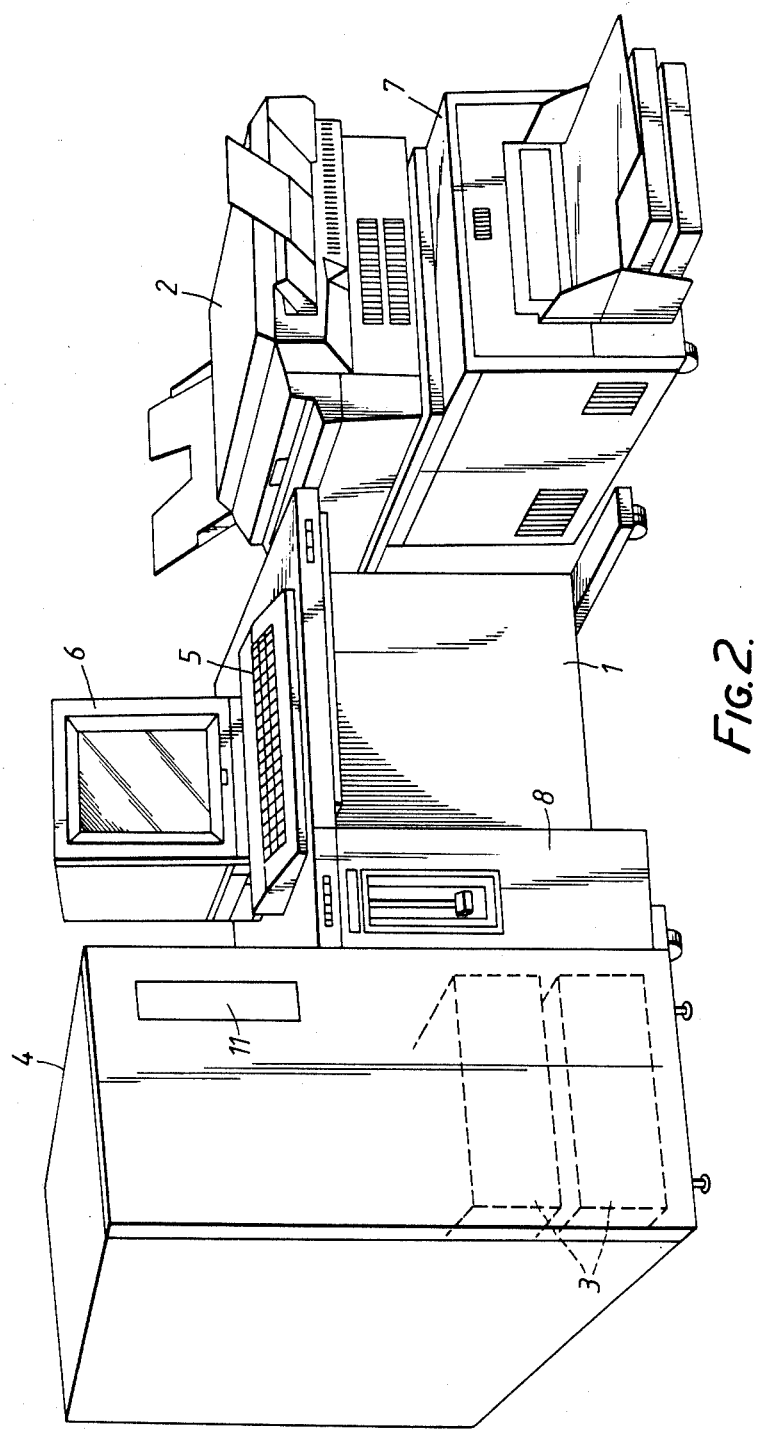
FIG. 2 is a perspective view of a data processing system employing the cassette changer of the invention.

One embodiment of the invention will now be described with reference to the drawings. FIG. 2 shows a data processing system, in which one embodiment of the automatic disk cassette changer of the invention may be utilized. Numeral 1 refers to a main controller. Main controller 1 is connected to a reader 2, an optical disk read/write unit 3, an automatic disk cassette changer 4 incorporating such optical disk unit 3, a keyboard 5, a display device 6, a recorder 7, and a floppy disk unit 8, being capable of performing various types of image information and data processing functions. Reader 2, which for example, is composed of a two-dimensional scanner, scans over a document in a two dimensional manner using a laser beam to generate electrical signals representing image information on the document. Optical disk read/write unit 3 incorporated in changer 4 records document image information read in reader 2 and supplied through main controller 1 onto an optical disk 9 (FIG. 3), described subsequently. Keyboard 5 is used to enter particular retrieval codes corresponding to document image information, and operation instructions.

Display device 6, which may, for example, incorporate a cathode ray tube (CRT) monitor, displays document image information read in reader 2 and supplied via main controller 1, document image information read from optical disk unit 3 and supplied via main controller 1, retrieval codes read from floppy disk unit 8 and supplied via main controller 1, and retrieval codes entered by keyboard 5. Recorder 7 outputs in hard copy the image information read in reader 2 and supplied via main controller 1, or the image information read from optical disk read/write unit 3 and supplied via main controller 1. Floppy disk unit 8 stores on a floppy disk the retrieval data identifying individual records of image information. The retrieval data includes retrieval codes entered from keyboard 5 and storage addresses on optical disk 9 which store the image information corresponding to the retrieval code.

As shown in FIG. 3, optical disk 9, which is provided with a two-sided information storage medium capable of recording and reproducing data via a by laser beam, is accommodated in a disk cassette 10. In one embodiment, disk cassette 10 is 340 mm (depth) by 350 mm (width) by 18 mm (thickness) in size, and weights 1.3 kg.

Automatic disk cassette changer 4 (FIG. 2), which is one embodiment is 1410 mm high by 660 mm wide by 1200 mm deep, has an input/output port 11 provided which permits a disk cassette 10 to be inserted and removed along the Z direction (front-to-back longitudinal direction).

Figure 1:
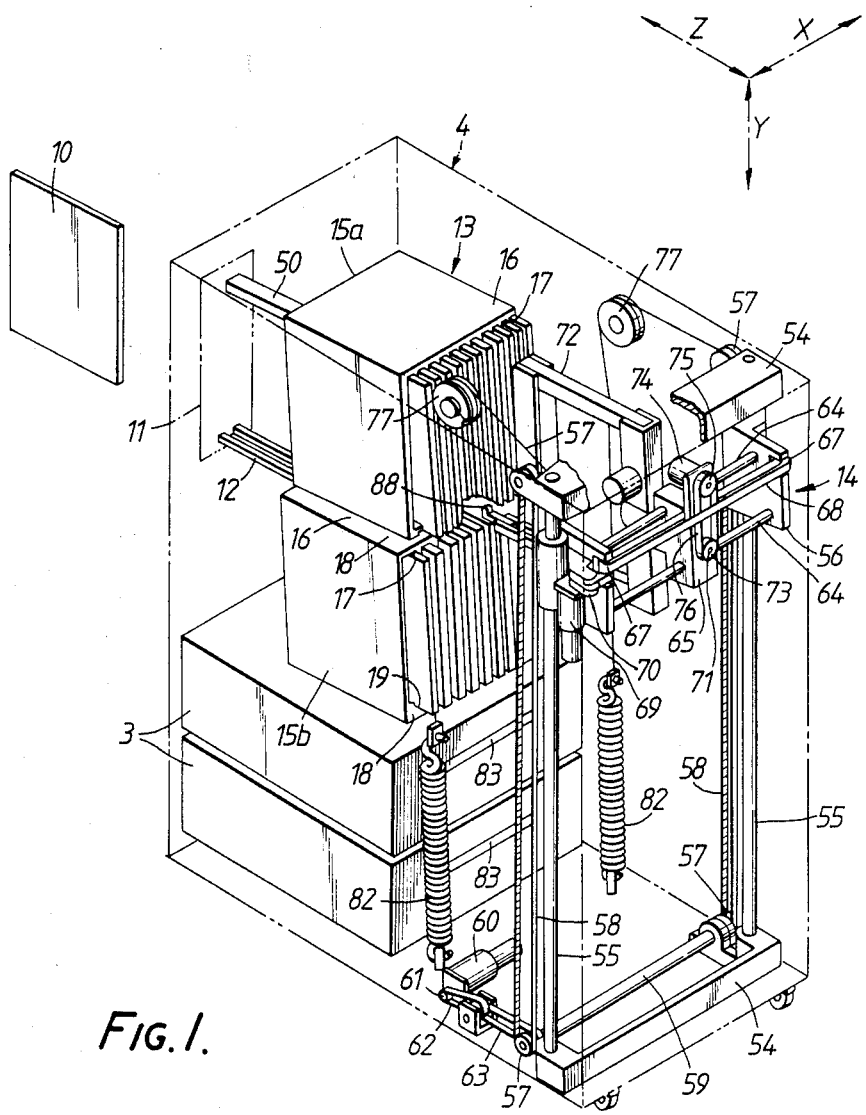
FIG. 1 is a perspective view of one embodiment of the automatic disk cassette changer of the invention, which shows its inner construction.

As shown in FIG. 1, changer 4 contains a loading device 12 which receives a disk cassette 10 through port 11, a disk storage rack 13 which stores a plurality of cassettes 10 inserted by loading device 12, two optical disk read/write units 3 which record and reproduce information on a disk 9 carried in cassette 10, and a transport device 14 which carries a cassette 10 between read/write units 3, loading device 12 and storage rack 13. Rack 13 and the two read/write units 3 are oriented in the Y (vertical) direction. The read/write units are described in greater detail in the copending U.S. application entitled "Cartridge Loading Apparatus," Ser. No. 674,299, filed Nov. 23, 1984.

Figure 5:
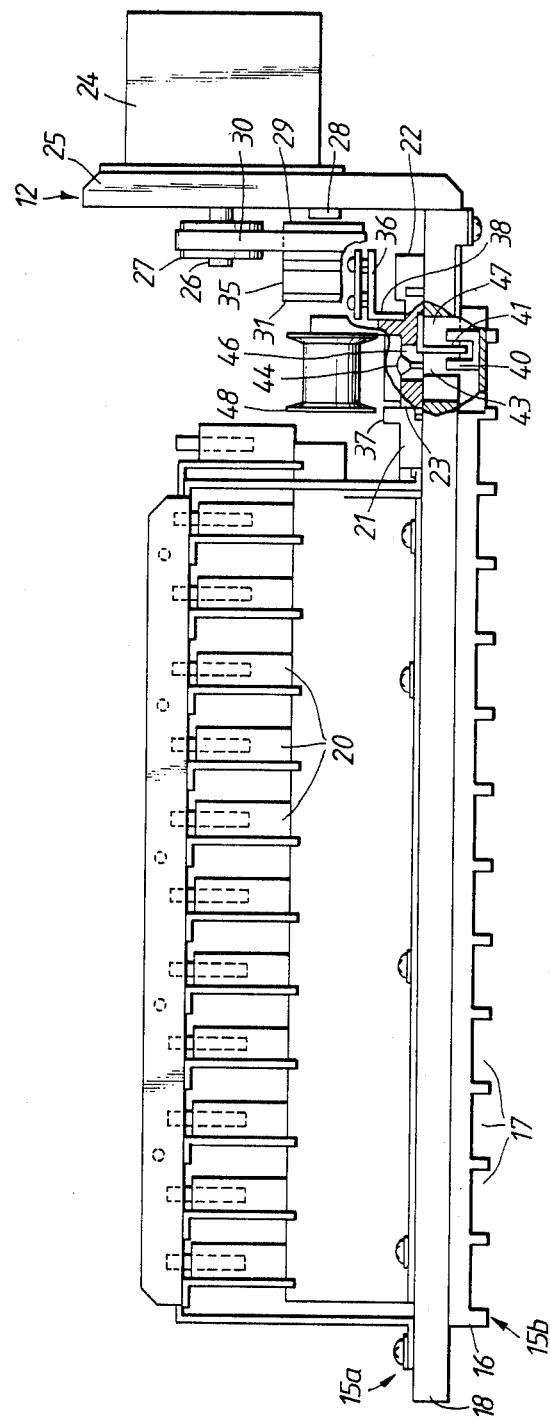
FIG. 5 is a front view of the cassette loading device.

Rack 13 consists of two upper and lower box-like storage racks 15a and 15b, each of which holds a number of standing and rear-projecting disk cassettes with a certain gap along the X (side-to-side) direction. The rear side of each disk cassette 10 is arranged to engage the cassette handling mechanism. The two storage racks 15a and 15b, as shown FIGS. 1, 4 and 5, have a top frame 16 equipped with top edge guide grooves 17 which guide the top end of disk cassettes 10. Base plate 18 has bottom guide grooves 19 (FIG. 4) which guide the bottom edges of the cassettes 10. The rear portion of the bottom guide grooves 19 are equipped with first detectors 20 which detect the presence of disk cassettes 10.

Figure 6:
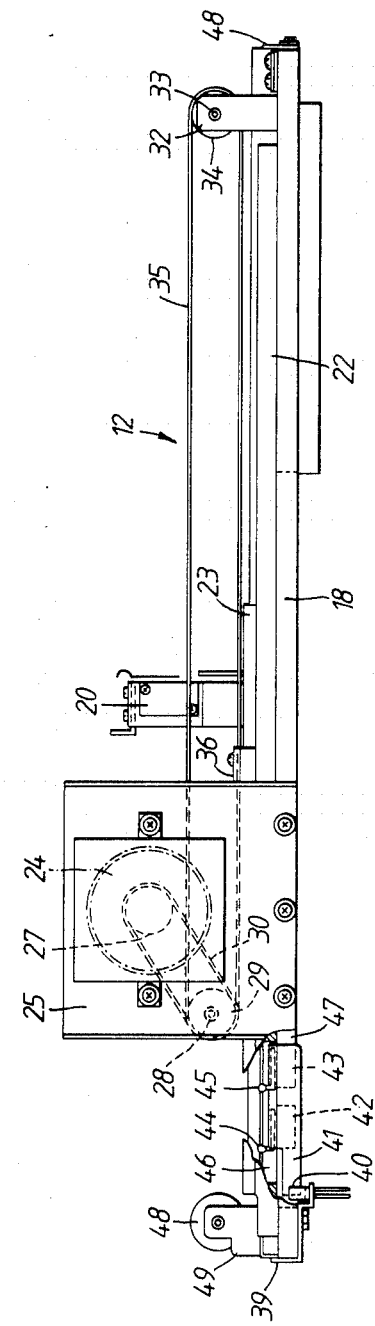
FIG. 6 is a side view of the loading device.

Loading device 12, as shown in FIGS. 1, 4 and 6, transports a disk cassette 10 from input/output port 11 in the Z direction to the rear of upper storage rack 15a so that it is put in the same position as other disk cassettes 10 already accommodated therein. Cassettes are transported in the opposite direction for unloading through input/output port 11. The right side of base plate 18 is extended toward port 11 and is provided with fixed first and second guide rails 21 and 22. A slide plate 23 is provided between rails 21 and 22 and supports the bottom edge of a disk cassette 10 for sliding in the Z direction. Slide plate 23 is driven by a stepping motor 24 (FIG. 6), which is mounted near the front end of base 18 on a supporting frame 25. The drive shaft 26 of stepping motor 24 is provided with a pulley 27. Supporting frame 25 has a dual pulley 29-31 supported on stationary shaft 28. Drive belt 30 couples the pulleys 27 and 29. A pulley 34 is supported near the rear end of the base 18 on a supporting frame 32 and a shaft 33. A belt 35 entrained on pulleys 31 and 34 provides drive motion in the Z direction in response to operation of motor 24. Belt 35 is coupled with slide plate 23 via a bracket 36, and operates to transfer slide plate 23 toward and away from loading port 11 in response to positive and negative revolution of stepping motor 24. Guide rail 21 and slide plate 23 are provided with projections 37 and 38 to guide the bottom edge of the cassette 10.

The front end of base 18 has a stop bracket 39 which stops slide plate 23; the stopping position is the initial position for slide plate 23. Whether or not slide plate 23 is located in the initial position is checked by a second detector 40 mounted on stop bracket 39. Second detector 40 comprises a light source and a photodetector opposing the light source. The lower surface of slide plate 23 is provided with a light interrupting plate 41 fixed such that when the slide plate 23 is located at the initial position, light interrupting plate 41 is inserted in the second detector 40, interrupting the light from the light source to the photodetector. Light interrupting plate 41 is equipped with a third detector 42 which checks whether disk cassette 10 has been inserted in the proper direction, and with a fourth detector 43 which checks whether disk cassette 10 has been inserted securely; detecting bars 44 and 45 are projected over slide plate 23 via a hole 46 opened therein. Base 18 has openings permitting the light interrupting plate 41, the third detector 42, and the fourth detector 43 to move with the slide plate 23. The rear end of base 18 has a stop 48 for preventing slide plate 23 from being moved beyond the rear limit position.

Figure 7:
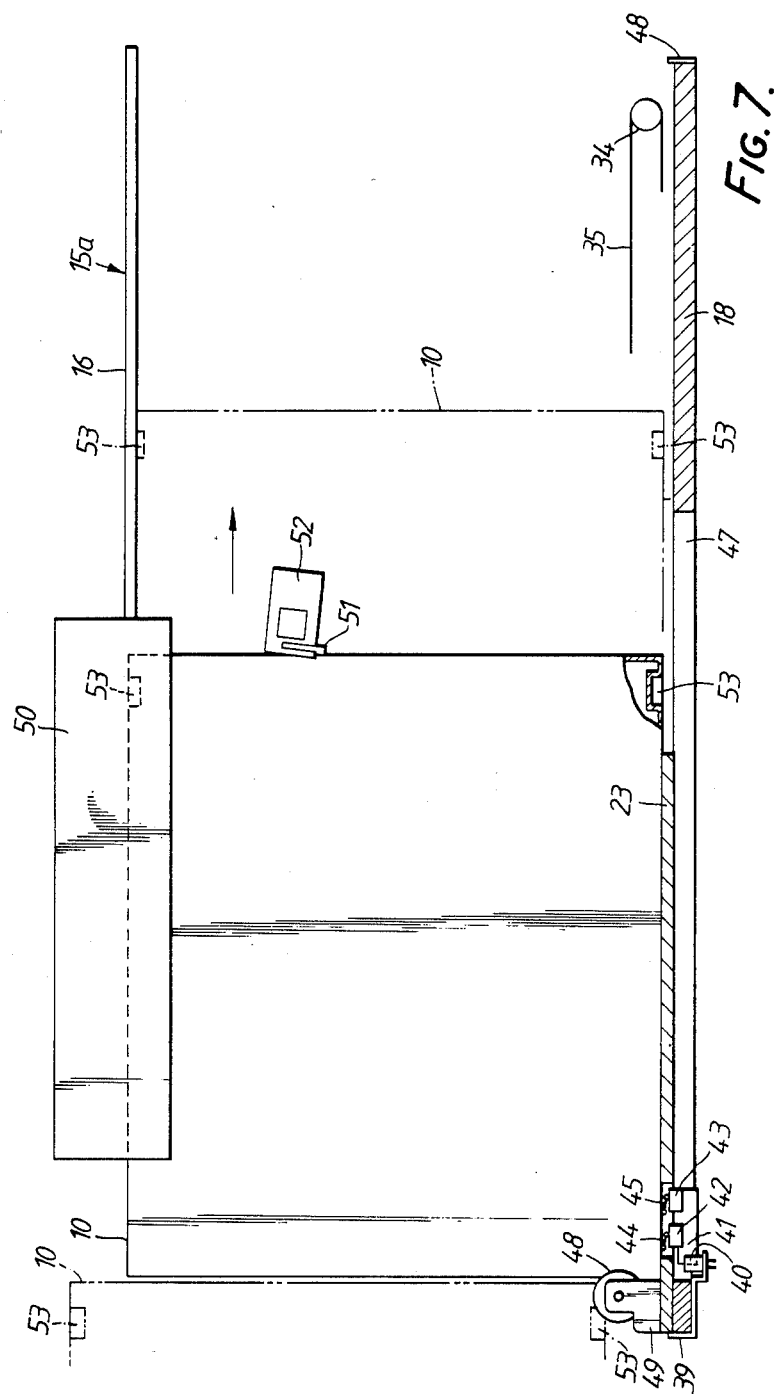
FIGS. 7 and 8 are side views showing the operation of the loading device.

Slide plate 23 is provided at it forward end with a guide roller 48 supported on bracket 49 to guide the bottom end of a disk cassette when it is inserted through loading port 11. As shown in FIG. 7, top frame 16 of upper storage rack 15a is equipped with a third guide 50 used to guide the top edge of the disk cassette 10 when it is inserted.

Figure 9:
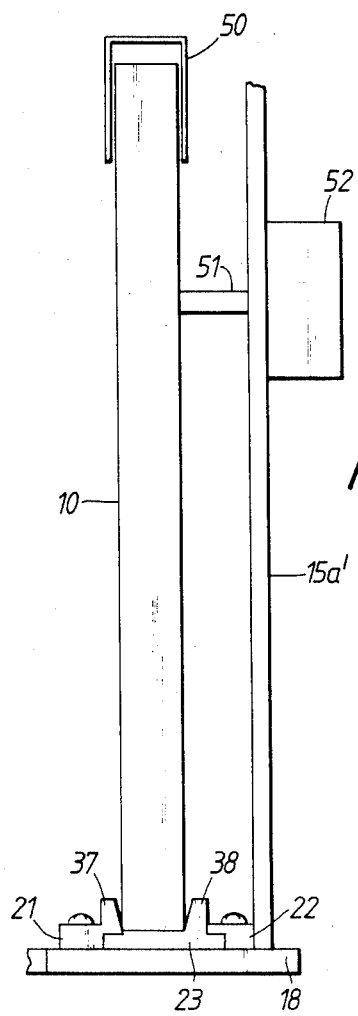
FIG. 9 is a front view showing a disk cassette inserted onto the sliding section.

The wall 15a' of upper storage rack 15a, as shown in FIGS. 4, 7 and 9, is provided with a solenoid-operated detent device 52 having a movable stop 51, which stops and catches along with guide roller 48 the inserted disk cassette 10. As soon as third detector 42 signals that disk cassette 10 has been inserted in the proper direction and fourth detector 43 indicates that the cassette has been inserted properly, stop 51 is withdrawn when solenoid 52 is activated, enabling disk cassette 10 to be released for rearward movement.

Assuming that slide plate 23 is in the initial (forward) position, disk cassette 10 is placed on guide roller 48 with its top edge in third guide 50, the standing disk cassette 10 is moved along slide plate 23, and is guided by guide 50, projection 38 on slide plate 23, and the projection 37 of first guide 21. Disk cassette 10, when it is inserted completely onto slide plate 23, is seated between guide roller 48 and stop 51, and thereby is located on slide plate 23 in the initial position. Note that in the initial position, cassette 10 projects beyond the end of slide plate 23, as shown in FIG. 7.

Figure 8:
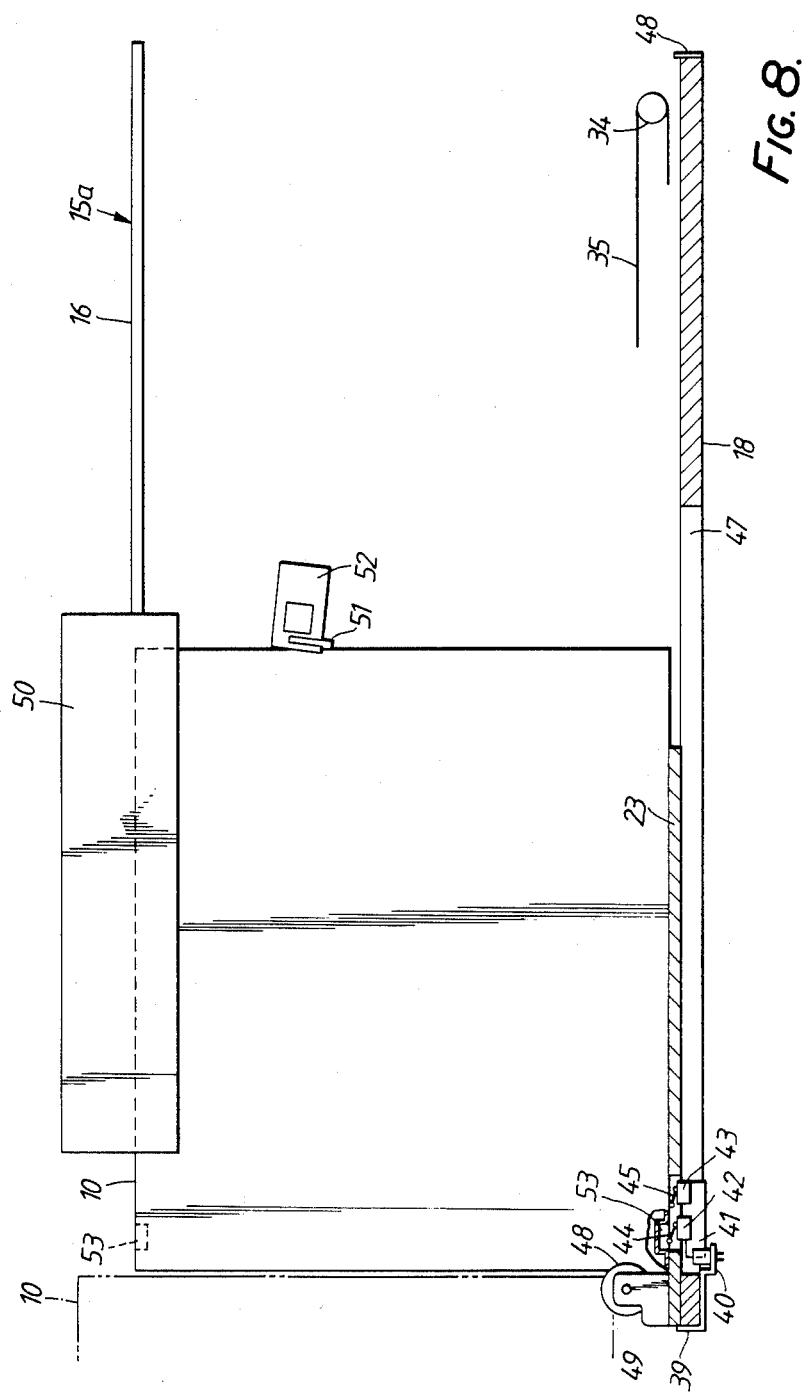

When the cassette is properly seated, third detector 42 checks whether it has been inserted in the proper direction, while fourth detector 43 checks whether it has been inserted securely. As shown in FIG. 7, disk cassette 10 is inserted in the proper direction, when a recess 53 provided in the bottom edge of the cassette faces the rear. The cassette 10 is inserted securely, when third and fourth detectors 42 and 43 are both turned on. As shown in FIG. 8, if the cassette is inserted backwards, fourth detector 43 is turned on, while third detector 42 is turned off since detecting bar 44 is not pushed. This indicates that the cassette 10 has not been inserted in the proper direction. If the cassette has been inserted in the proper direction, stop 51 is released, but if it has been inserted improperly, stop 51 is not released.

Figure 11:
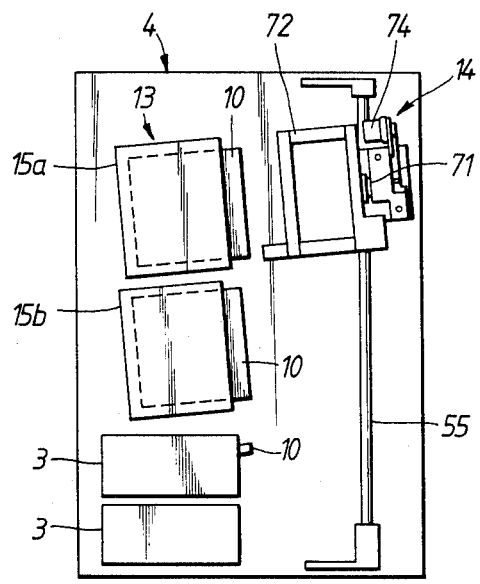
FIG. 11 is a side view of the changer showing the overall arrangement of the cassette storage units and carrying frame.

When it is checked that disk cassette 10 has been inserted in the proper direction and stop 51 is released, stepping motor 24 operates to drive slide plate 23 toward upper storage rack 15a with disk cassette 10 supported as shown in FIG. 9. In this position, disk cassette 10 loaded on slide plate 23 is oriented in the same state as cassettes already loaded in upper storage rack 15a. Use of motor 24 as the drive source for slide plate 23 provides high stop position accuracy and permits slide plate 23 to be fixed in a stop position as shown in FIG. 11 by the selfholding force of the motor. Thus, a cassette which has been carried into rack 15a by the loading device 12 may be handled by cassette handler 14 in the same manner as cassettes already stored in storage unit 13. When the cassette is in the stop position a portion of the cassette projects beyond the rear of rack 15a (FIG. 11).

Next, cassette handler 14 will be explained in detail. As shown in FIG. 1, a frame 54 has a pair of first guide shafts 55, 55 arranged along the Y direction in parallel. Between first guide shafts 55, 55, a first carriage 56 is supported for movement in the Y direction. A pair of rollers 57 are supported near the upper and lower ends of shafts 55. A pair of belts 58 are entrained over rollers 57 and are adapted to run endlessly parallel to the guide shafts 55, 55. Rollers 57, 57 located at the lower end are rotatably driven by a shaft 59, which is rotated by a stepping motor 60 via a pulley 61 and belts 62 and 63. Carriage 56 is fixed to the belts 58, 58 so that positive and negative rotation of stepping motor 60 causes the carriage 56 to be moved to the Y direction.

First carriage 56 has a pair of horizontal guide shafts 64, 64 arranged between sideplates 56 in parallel. Between second guide shafts 64, 64, a second carriage 65 is slidably mounted for movement in the X direction. First carriage 56 has rollers 67, 67 supported at near the right and left ends of second guide shafts 64, 64. A belt 68 entrained over rollers 67, 67 runs endlessly in the X direction parallel to the second guide shafts 64. The roller 67 located at the right end is driven by a stepping motor 69 via a belt 70. Belt 68 is coupled to the second carriage 65 so that positive and negative rotation of stepping motor 69 causes second carriage 65 to be moved to the X direction.

Second carriage 65 has a turn shaft 71 supporting a fixed carrying frame 72. The other end of turn shaft 71 is provided with a pulley 73, which is driven by a stepping motor 74 via a pulley 75 and a belt 76. Positive and negative rotation of stepping motor 74 causes carrying frame 72 to be turned positively and negatively to rotate the frame 90 degrees between the vertical position illustrated in FIG. 1 to a horizontal position.

Figure 10:
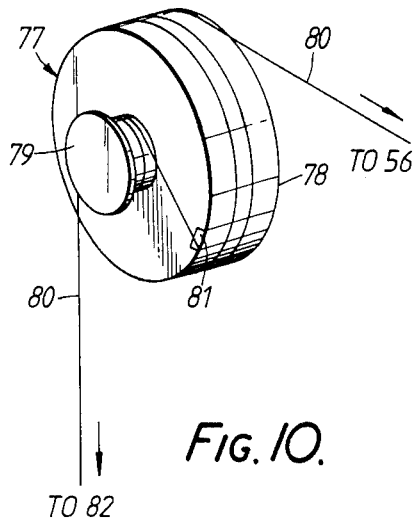
FIG. 10 is a perspective view of a cable operator used in the changer.

Frame 54 is associated with a pair of wheel and axles mechanisms 77, 77 supported on the sides of housing 4. Each mechanism 77 is composed of a wheel 78 having a larger diameter and a axle 79 having a smaller diameter integrated coaxially with each other (as shown in FIG. 10). The mechanisms 77 are equipped with a wire 80. One end of wire 80 is fixed to first carriage 56. The mid portion of wire 80 is wound on wheel 78 and axle 77 via a recess 81. The other end of wire 80 is coupled with one end of a spring 82. The other end of spring 82 is anchored to the bottom of frame 54. This arrangment maitains a uniform force on motor 60 regardless of the position or direction of movement of carriage 56.

Disk inlet ports 83, 83 of optical disk units 3, 3 accept a disk cassette 10 oriented horizontally. Turn shaft 71 of second carriage 65 is rotated to position frame 72 at the same angle as disk inlet ports 83, 83.

Figure 12:
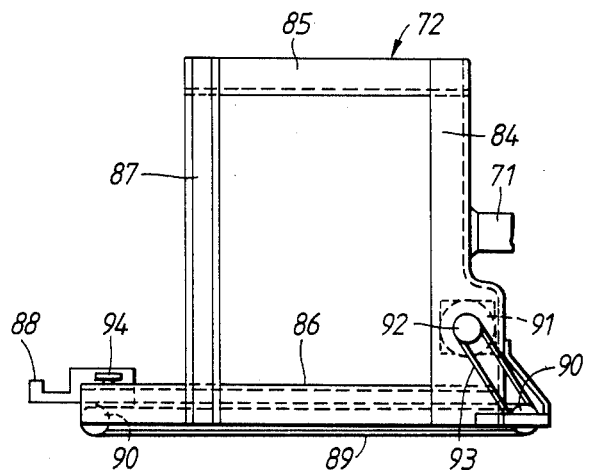
FIG. 12 is a side view of the carrying frame.

Carrying frame 72, as shown in FIGS. 12 and 13, is formed in a rectangle-like shape by a frame 84 supported at the end of turn shaft 71. Frame 72 has an upper guide rail 85, fitted on frame 84, which guides the top edge of disk cassette 10, a lower guide rail 86, fitted in the frame 84, which guides the bottom edge disk cassette 10, and reinforcement plates 87, 87 which couple and reinforce upper guide rail 85 and lower guide rail 86. Carrying frame 72, as shown in FIG. 14, completely cradles and supports a disk cassette 10. Lower guide rail 86, which is longer than upper guide rail 85, is provided with a sliding pawl 88 which engages recess 53 (FIG. 15) of disk cassette 10 whereby the cassette can be pulled into position in carrying frame 72 and can be fed therefrom. Pawl 88 is coupled to a belt 89, which is entrained on rollers 90 fitted at both ends of the lower guide rail 86. The rear roller 90 is coupled by belt 93 to a pulley 92 driven by a stepping motor 91 fitted on frame 84. Positive and negative rotation of stepping motor 91 moves the sliding pawl 88 along guide rail 86. As shown in FIGS. 16 and 17, the tip of lower guide rail 86 is equipped with a pair of guide rollers 94, 94 to guide the edge of a disk cassette 10 when it is caught and fed.

Figure 18A:
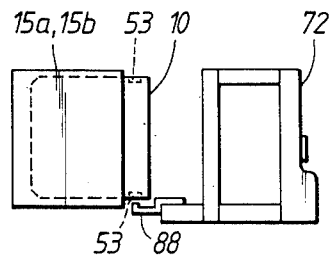
FIGS. 18A through 18C are schematic side views showing the operation of transferring a disk cassette from a storage rack to the carrying frame.
Figure 18B:
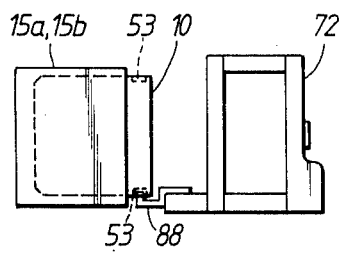
Figure 18C:
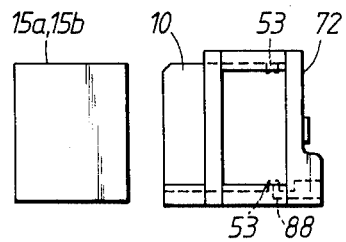

As shown in FIG. 18A, when disk cassette 10 is taken from storage rack 15a to carrying frame 72, sliding pawl 88 is located somewhat below the bottom thereof. As shown in FIG. 18B, the whole carrying frame 72 is raised to insert the tip of pawl 88 in recess 53 of disk cassette 10. As shown in FIG. 18C, sliding pawl 88 is driven to the right to pull the disk cassette into carrying frame 72. Feeding the disk cassette 10 from the carrying frame back into the storage rack 15a, 15b is accomplished by reversing the above sequence of operations.

Figure 19A:
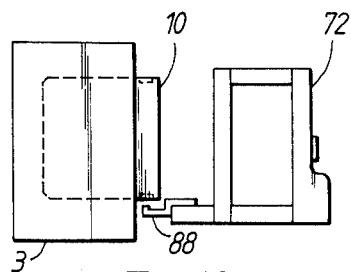
FIGS. 19A through 19C are schematic side views showing the operation of transferring a disk cassette from the optical disk unit to the carrying frame.
Figure 19B:
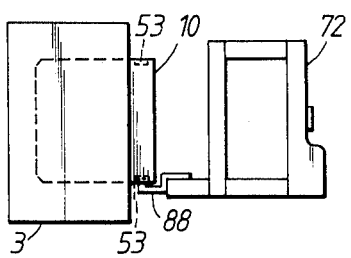
Figure 19C:
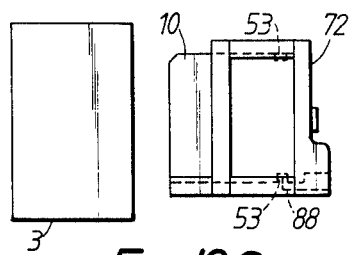

Taking disk cassette 10 from optical disk units 3, 3 to carrying frame 72 is identical to taking disk cassette 10 from storage racks 15a, 15b to carrying frame 72, except that carrying frame 72 is oriented horizontally instead of vertically, as shown in FIGS. 19A through 19C.

Carrying device 14 is so constructed, where the initial position (carry start position) corresponds to the central position in the Y direction of storage racks 15a, 15b (direction of stacking disk cassettes), takes out disk cassette 10 as moving it to the horizontal direction. Carrying frame 72 is turned at the initial position, and is also moved to the Z direction. Carrying device 14 loads optical disk unit 3 with a disk cassette 10 carried in by carrying in and out device 12, turning carrying frame 72 to the correct position on the basis of information on one side of disk 9, read by optical disk unit 3, which gives identification of the side A or B, and accommodates disk cassette 10 in storage rack 15a or 15b in the same direction as the other disk cassettes.

Figure 20:
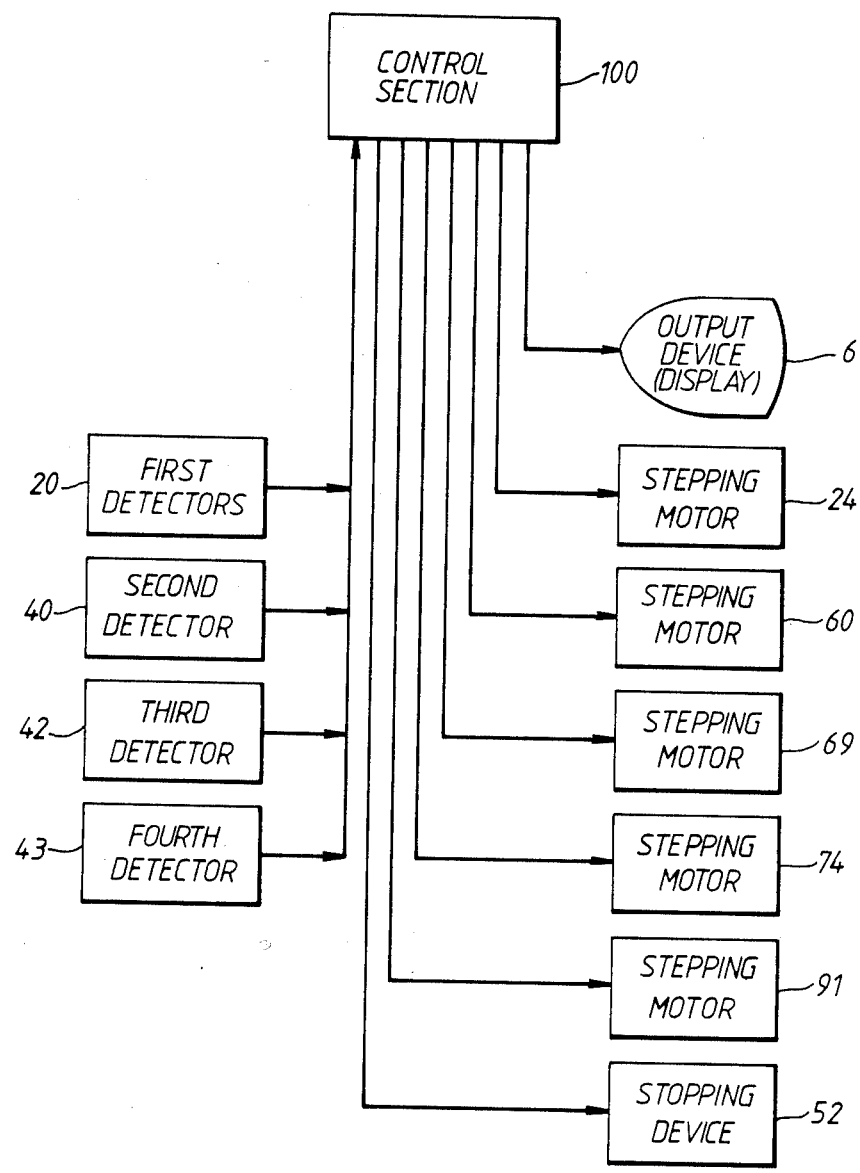
FIG. 20 is a circuit schematic showing the control logic for operating the drive motors and interlocks to enable the system to perform the cassette loading and handling functions.

FIG. 20 schematically illustrates the control circuits employed in operating the various motors and solenoid devices to achieve the above described system functions.

When a cassette has been properly positioned on slide plate 23, as indicated by detectors 40, 42, 43 in the manner previously described, control section 100 feeds a drive signal to the stopping device 52 consisting of the rotary solenoid 51, causing the solenoid to retract the stop arm from the path of the disk cassette 10, permitting transport thereof.

If the cassette is not properly positioned on slide plate 23, no drive signal is supplied to the stopping device 52 and the control section 100 signals the output display device 6, causing the latter to display the operator instruction "Insert the cassette in right direction."

When the disk cassette 10 is inserted in the right direction so that the stop 51 is retracted from the cassette transport path, the stepping motor 24 is driven forwardly by a drive signal supplied from the control section 100, so that the slide plate 23 with the disk cassette 10 thereon is run toward the upper boxlike storage rack 15a. The slide plate 23 is stopped when it reaches a predetermined position according to a predetermined number of pulses of the drive signal supplied from the control section 100.

Then, the stepping motor 69 is rotated according to a predetermined number of pulses of the drive signal supplied from the control section 100 until the second carriage 65 with the carrying frame 72 secured thereto is brought to the position of the disk cassette 10 on the slide plate 23. At this time, the sliding pawl 88 of the carrying frame 72 is brought to a position slightly below the lower portion of the disk cassette 10 as shown in FIG. 18A. The control section 100 then supplies a drive signal of a predetermined pulse number to the stepping motor 60 to drive the motor 60 via the belts 58. The first carriage 56 with the carrying frame 72 secured thereto is thus raised, bringing the sliding pawl 88 of the carrying frame 72 into the recess 53 of the disk cassette 10, as shown in FIG. 18B. The control section 100 then supplies a drive signal of a predetermined pulse number to the stepping motor 91 to drive this motor so as to move the slide pawl 88 via the belts 93 and 89 into the carrying frame 72, thus causing the disk cassette 10 to be withdrawn into the carrying frame 72. Subsequently, through rotation of the stepping motor 69, the carrying frame 72 is brought up to the initial position, which is the center position of the storage rack 15a.

The control section 100 then supplies a drive signal of a predetermined pulse number to the stepping motor 7 to drive the motor 74. As a result, the carrying frame 2 which has been in the upright state is turned 90 degrees. The control section 100 then supplies a drive signal of a predetermined pulse number to drive the stepping motor 60, thus lowering the carrying frame 72 via the belts 58 to the position of the optical disk unit 3.

The disk cassette 10 facing the disk inlet port 3 of the optical disk unit 3 is inserted into the unit 3 through the inlet port 83. More specifically, the stepping motor 91 receiving the drive signal of the predetermined pulse number from the control section 100 is driven in the reverse direction, causing the disk cassette 10 to be fed out from the carrying frame 72 and inserted through the inlet port 83 of the unit 3. When the insertion is completed, a drive signal is supplied to the stepping motor 74 to separate the sliding pawl 88 of the frame 72 from the recess 53 of the disk cassette 10. At this position, the carrying frame 72 is in the stand-by state.

The disk cassette 10 is automatically brought to a predetermined position in the unit 3 by the transport mechanism provided therein. The unit 3 identifies the side A or B of the disk cassette 10 and also reads out data on the disk. The identification signal and the signal of the data on the disk are fed to the control section 100. The disk cassette 10, after the identification signal is received, is transported by the transport mechanism in the unit 3 to the position shown in FIG. 19A, and the recess 53 of the cassette 10 again faces the sliding pawl 88 of the carrying frame 72 in the stand-by state. The control section 100 then supplies again a drive signal of a predetermined pulse number to the stepping motor 69 to move the carrying frame 72 up to a position, at which the sliding pawl 88 is inserted in the recess 53 of the disk cassette 10, as shown in FIG. 19B. The control section 100 supplies a drive signal of a predetermined pulse number to the stepping motor 91, thus causing the sliding pawl 88 to be moved via the belts 92 and 86 into the carrying frame 72 up to a position, at which the disk cassette 10 is found in the frame 72.

The control section 100 then supplies a drive signal of a predetermined pulse number to the stepping motor 60. With the rotation of the stepping motor 60, the first carriage 56 is raised via the belts 58 up to a position at which the carrying frame 72 faces the rack 15a. Then, the stepping motor 71 is driven to turn the carrying frame 72 by 90 degrees from the turn-down state to the upright state.

The identification signal representing the side A or B of the disk cassette 10 supplied from the optical disk unit 3 to the control section 100 and a drive signal of a predetermined pulse number based on the data on the disk are supplied to the stepping motor 69. The carrying frame 72 is thus moved in the rack 15a up to a vacant position where no disk cassette has been accommodated yet. When this vacant position is reached, the carrying frame 72 is stopped.

The control section 100 then supplies a drive signal of a predetermined pulse number to the stepping motor 91 to drive the motor 91 until the sliding pawl 88 locked in the recess 53 of the disk cassette 10 is brought to a position out of the carrying frame 72. With this movement of the sliding pawl 88, the disk cassette 10 is taken out of the carrying frame 72 and inserted in the vacant space in the rack 15a. At this time, the first detector 20 detects that the cassette 10 is inserted in the rack 15a and supplies a detection signal to the control section 100.

After the disk cassette 10 has been inserted in the rack 15a, the carrying frame 72 is moved by the stepping motor 69 to the center of the rack 15a, i.e., the initial position.

As has been described, after the insertion of the disk cassette 10 through the loading port 11, the optical disk unit 3 identifies its side A or B and reads the data on the disk, and then it is accommodated in a vacant position of the rack 15a. The number of revolutions of the stepping motor 69 for moving the carrying frame 72 toward the stack of disk cassettes in front of the rack 15a, i.e., pulse number of drive signal supplied from the control section 100 to the stepping motor 69, determines which of the plurality of disk cassettes 10 accommodated in the rack 15a will be selected and set in the optical disk unit 3.

The following summarizes the overall operation of the automatic disk cassette changer. Disk cassette 10 inserted from loading port 11 is carried into the store located at the end of upper storage rack 15a by carrying in and out device 12. Disk cassette 10 is loaded into either optical disk unit 3 by carrying device 14 for identification of the side A or B thereby. Disk cassette 10 is carried by carrying device 14 from optical disk unit 3 to storage rack 15a or 15b, and is accommodated in the same direction as the other disk cassettes. When a direction is given from the operator, carrying device 14 takes the specified disk cassette 10 out of the storage rack 15a or 15b based on the direction to load the specified optical disk unit 3. If a few directions have been given, carrying device 14 takes the next specified disk cassette 10 out of storage rack 15a or 15b for loading the other optical disk unit 3, waiting for the termination of the operation of either optical disk unit 3. Carrying device 14, upon the termination of the operation of either optical disk unit 3, takes out disk cassette 10 for returning to storage rack 15a or 15b, takes the next specified disk cassette 10 out of storage rack 15a or 15b, and loads the empty optical disk unit 3. This operation is repeated as required by the control instructions. If a discharge direction has been given by the operator, carrying device 14 takes the specified disk cassette 10 out of storage rack 15a or 15b for supplying to carrying in and out device 12. Disk cassette 10 is discharged by carrying in and out device 12 through the input/output port 11.

The above construction incorporating carrying in and out device 12 makes it unnecessary to manually accommodate disk cassette 10 through port 11 to storage rack 15a; manual operation is completed when disk cassette 10 is inserted from the outside onto sliding plate 23. Disk cassette 10 can be led to the specified position in the correct inserting direction without disk cassette 10's coming off sliding plate 23 during running.

The optical disk unit, although it has been desribed herein as a device to both record and reproduce information, may be a device to only record or only reproduce information.

As described above, the automatic disk cassette changer relating to the invention, since it is provided with the inlet/outlet port for a disk cassette containing a disk as information storage media, the carrying in and out device which carries in and out the disk cassette through the inlet/outlet port, the store which has the capability to accommodate more than one disk cassette carried in by the carrying in and out device, the information recording/reporduction device which records or reproduces information on a disk in the carried in disk cassette, and the carrying device which carries the disk cassette among the information recording/reproduction device, the carrying in and out device and the store, is capable of automatically carrying in and out disk cassettes, providing a significant effect that manual operation may be eliminated.

Further, since the construction of the carrying device is such that the disk cassette is taken in the carrying frame and is held completely therein, the disk cassette can be carried in a good and accurate state, without increasing the weight and dimensions of the whole unit.

What is claimed is:

1. An automatic disk changer comprising:
   a main body equipped with a loading port formed in a slot shape extending in a predetermined direction for receiving a disk cassette containing an information storing disk oriented in a plane along said predetermined direction;
   loading means for loading and unloading said disk cassette via said loading port;
   storage means provided in said main body and oriented parallel to the plane along said predetermined direction for storing a plurality of disk cassettes oriented parallel to said plane, said storage means being stationary during operation of the disk changer;
   information recording/reproducing means provided in said main body for recording or reproducing information on or from said information storing disk in said disk cassette, said recording/reproducing means being stationary; and
   carrying means provided in said main body for carrying said disk cassette between said storage means and said information recording/reproducing means and for loading said disk cassette into said latter means followed by a retraction of said disk cassette for return to said storage means.

2. An automatic disk cassette changer according to claim 1, wherein said loading means comprises:
   a base;
   a sliding plate provided on said base for supporting said disk cassette on an edge thereof and for sliding said cassettes into said main body;
   first and second guide members for catching and guiding said sliding plate; and
   a third guide member for guiding the edge of said disk cassette opposite said supported edge.

3. An automatic disk cassette changer according to claim 1, wherein said carrying means includes a carrying frame for holding said disk cassette.

4. An automatic disk cassette changer according to claim 3, wherein said carrying frame comprises:
   a frame;
   an upper guide rail fitted on said frame for guiding a top edge of said disk cassette;
   a lower guide rail fitted on said frame for guiding a bottom edge of said disk cassette; and
   reinforcement means interconnecting said upper and lower guide rails.

5. An automatic disk cassette changer according to claim 3, wherein said carrying means includes a sliding pawl provided on said carrying frame for drawing a disk cassette into said carrying frame and for feeding said disk cassette from said carrying frame.

6. An automatic disk cassette changer according to claim 1, wherein said predetermined direction is a vertical direction so that said loading port extends in a vertical direction to permit said disk cassette to be inserted in an upright state and so that said storage means stores said disk cassette in an upright state.

7. An information storage cassette handling apparatus comprising in combination:
   a main body equipped with a loading port for receiving a disk cassette containing an information storing disk;
   Cassette loading means for receiving a disk cassette to be loaded into said apparatus via said loading port;
   transport means for moving said disk cassette from said loading means into a handling area of said apparatus for handling during information processing operations;
   detection means for detecting the orientation and seating of said disk cassette received via said loading port in said loading means and for generating an output signal indicating that said disk cassette is properly oriented and properly seated in said loading means; and
   detent means responsive to said output signal for blocking the operation of said transport means until said output signal is generated.

8. The apparatus of claim 7 further comprising:
   display means;
   means for generating an error signal when said cassette is improperly seated or oriented in said loading means; and
   means for operating said display means in response to generation of said error signal to cause said display means to provide a visual error indication to alert an operator to said improper seating orientation.

9. An automatic disk changer comprising:
   a main body equipped with a loading port formed in a slot shape extending in a predetermined direction for receiving a disk cassette containing an information storing disk oriented in a plane along said predetermined direction;
   loading means for loading and unloading said disk cassette via said loading port;
   storage means provided in said main body and oriented parallel to the plane along said predetermined direction for storing a plurality of disk cassettes oriented parallel to said plane, said storage means being stationary during operation of the disk changer;
   a plurality of information, recording/reproducing units provided in said main body for recording or reproducing information on or from said information storing disk in said disk cassette, said plurality or recording/reproducing means being stationary; and carrying means, provided in said main body for carrying said disk cassette between said storage means and said plurality of information recording/reproducing units and for loading said disk cassette into said information recording/reproducing units and retracting said disk cassette for return to said storage means, operable to sequentially load each of said plurality of information recording/reproducing units with selected ones of said disk cassettes followed by retraction of said disk cassettes from selected ones of said information recording/reproducing units for return to said storage means.

10. An optical disk cassette handling apparatus comprising:

a main body having a slot, for receiving a disk cassette oriented in a plane along a predetermined direction;

storage means, fixedly disposed in said main body, for storing a plurality of disk cassettes oriented parallel to said plane;

loading means for loading and unloading a disk cassette through said slot to and from, respectively, said storage means;

a plurality of optical disk read/write units fixedly disposed in said main body; and carrying means for transporting a disk cassette from said storage means to a selected one of said optical disk read/write units, loading said disk cassette into said selected one of said optical disk read/write units, retracting said disk cassette from said selected one of said optical disk read/write units and transporting siad disk cassette from said selected one of said optical disk read/write units to said storage means.

11. An optical disk cassette handling apparatus as claimed in claim 10 further comprising:

means operating in a first state for blocking and operative in a second state for unblocking the loading of a disk cassette from the loading means to the storage means;

detection means for detecting the orientation and seating of the disk cassette onto said loading means;

means responsive to said detection means for generating an output signal at times when the disk cassette is oriented and seated in said loading means in a predetermined position; and means responsive to said output signal for operating the blocking means to the second state.

* * * * *